United States Patent
Ideses et al.

(10) Patent No.: US 9,807,639 B2
(45) Date of Patent: Oct. 31, 2017

(54) NETWORK TRAFFIC EVENT MANAGEMENT AT THE CLIENT TERMINAL LEVEL

(71) Applicant: Shine Security Ltd., Herzlia Pituach (IL)

(72) Inventors: Ianir Ideses, RaAnana (IL); Itay Katz, RaAnana (IL); Doron Shamia Sadeh, Givataim (IL)

(73) Assignee: Shine Security Ltd., Herzlia Pituach (IL)

( * ) Notice: Subject to any disclaimer, the term of this patent is extended or adjusted under 35 U.S.C. 154(b) by 98 days.

(21) Appl. No.: 14/608,369

(22) Filed: Jan. 29, 2015

(65) Prior Publication Data
US 2015/0215804 A1    Jul. 30, 2015

Related U.S. Application Data

(60) Provisional application No. 61/933,366, filed on Jan. 30, 2014.

(51) Int. Cl.
| | |
|---|---|
| *H04W 28/02* | (2009.01) |
| *H04L 12/863* | (2013.01) |
| *H04L 12/927* | (2013.01) |
| *H04W 24/08* | (2009.01) |
| *H04L 12/24* | (2006.01) |

(52) U.S. Cl.
CPC ......... *H04W 28/02* (2013.01); *H04L 41/5022* (2013.01); *H04L 47/625* (2013.01); *H04L 47/6295* (2013.01); *H04L 47/803* (2013.01); *H04W 24/08* (2013.01); *H04L 41/142* (2013.01)

(58) Field of Classification Search
CPC .. H04W 28/02; H04W 24/08; H04L 47/6295; H04L 47/625; H04L 41/5022; H04L 41/142; H04L 47/803
USPC .......................................... 370/230
See application file for complete search history.

(56) References Cited

U.S. PATENT DOCUMENTS

| | | | |
|---|---|---|---|
| 7,891,001 B1 | 2/2011 | Greenawalt et al. | |
| 2010/0077483 A1 | 3/2010 | Stolfo et al. | |
| 2010/0186088 A1* | 7/2010 | Banerjee | G06F 21/51 726/23 |
| 2010/0205189 A1 | 8/2010 | Ebrahimi et al. | |

(Continued)

OTHER PUBLICATIONS

Official Action dated Feb. 26, 2016 From the US Patent and Trademark Office Re. U.S. Appl. No. 14/608,371.
(Continued)

*Primary Examiner* — Jung Park

(57) ABSTRACT

A method of queuing network traffic events on a client terminal. The method comprises monitoring, in run time, a plurality of network traffic events triggered by a plurality of applications executed on a client terminal, extracting a plurality of network traffic event characteristics of each of the plurality of network traffic events, classifying each one of the plurality of network traffic events according to a respective the plurality of network traffic event characteristics, clustering the plurality of network traffic events in a plurality of clusters according to the classifying, and managing an opening a plurality data connections between the client terminal and a network such that the content of each cluster of the plurality of clusters is transmitted in another of the plurality data connections.

18 Claims, 2 Drawing Sheets

(56) References Cited

U.S. PATENT DOCUMENTS

| | | | |
|---|---|---|---|
| 2012/0196565 A1* | 8/2012 | Raleigh | G06Q 10/06375 |
| | | | 455/406 |
| 2013/0347114 A1 | 12/2013 | Altman et al. | |
| 2014/0143864 A1* | 5/2014 | Miliefsky | H04L 63/20 |
| | | | 726/22 |
| 2015/0213365 A1 | 7/2015 | Ideses et al. | |
| 2015/0213376 A1 | 7/2015 | Ideses et al. | |
| 2015/0215330 A1 | 7/2015 | Katz et al. | |

OTHER PUBLICATIONS

Official Action dated Apr. 3, 2017 From the US Patent and Trademark Office Re. U.S. Appl. No. 14/608,371. (15 pages).

Examiner-Initiated Interview Summary dated Dec. 8, 2016 From the US Patent and Trademark Office Re. U.S. Appl. No. 14/608,371. (5 pages).

Applicant-Initiated Interview Summary dated Nov. 21, 2016 From the US Patent and Trademark Office Re. U.S. Appl. No. 14/608,371. (3 pages).

Official Action dated Sep. 8, 2016 From the US Patent and Trademark Office Re. U.S. Appl. No. 14/608,371.

\* cited by examiner

NETWORK TRAFFIC EVENT MANAGEMENT AT THE CLIENT TERMINAL LEVEL

RELATED APPLICATION

This application claims the benefit of priority under 35 USC 119(e) of U.S. Provisional Patent Application No. 61/933,366 filed Jan. 30, 2014, the contents of which are incorporated herein by reference in their entirety.

BACKGROUND

The present invention, in some embodiments thereof, relates to network uplink transmission management and, more specifically, but not exclusively, to systems and methods of network traffic events management at the client terminal level.

Signaling in cellular networks is the action carried out by a client terminal, an end device, and a base station subsystem (BSS) and the Network switching subsystem (NSS) of a cellular network for exchanging data between the client terminal and the cellular network. These signals are used to change the states of the cellular device with relation to the network, for example, a device may have open data channels, may be in low power mode, or can be idle with respect to the cellular network.

Signaling for cellular network resources originated from applications executed by the client terminal requires opening and closing data connections between the client terminal and the cellular network, for example the BSS and the NSS. The requirement of the action of opening and closing data connections for signaling may not be directly correlated with the actual amount of data requested from the cellular network by a network traffic event triggering the action of opening and closing data connections for signaling.

SUMMARY

According to some embodiments of the present invention, there is provided a method of queuing network traffic events on a client terminal. The method comprises monitoring, in run time, a plurality of network traffic events triggered by a plurality of applications executed on a client terminal, extracting a plurality of network traffic event characteristics of each of the plurality of network traffic events, classifying each one of the plurality of network traffic events according to a respective the plurality of network traffic event characteristics, clustering the plurality of network traffic events in a plurality of clusters according to the classifying, and managing an opening a plurality data connections between the client terminal and a network such that the content of each cluster of the plurality of clusters is transmitted in another of the plurality data connections.

Optionally, the plurality of network traffic events are messages for opening a data connection with the network.

Optionally, the managing comprises queuing each one of the plurality of network traffic events in one of a plurality of queues according to the classifying; and transmitting the content of each of the plurality of queues in another of the plurality data connections.

Optionally, the plurality of network traffic event characteristics comprise characterizing application data about one of the plurality of applications.

More optionally, the characterizing application data is deduced from an analysis of application marketing page.

Optionally, the plurality of network traffic event characteristics comprise an outcome of statistical analysis of historical network traffic events.

Optionally, the plurality of network traffic events are data messages; wherein the plurality of network traffic event characteristics comprise a target address specified in a respective the network traffic event.

More optionally, the plurality of network traffic event characteristics comprise a battery usage of an application from the plurality of applications.

More optionally, the plurality of network traffic event characteristics comprise a data consumption pattern of an application from the plurality of applications.

Optionally, the client terminal is a cellular device and the network is a cellular network.

Optionally, the extracting comprises generating a plurality of feature vectors each describing respective the plurality of network traffic event characteristics of another of the plurality of network traffic events; wherein the classifying is performed by an analysis of the plurality of feature vectors.

Optionally, the classifying is performed by at applying at least one classifier calculated according to a statistical analysis of network traffic event characteristics of a plurality of historical network traffic events.

Optionally, the classifying comprises identifying a quality of service level for each of the plurality of network traffic events; wherein queuing each one of the plurality of network traffic events is performed according to a respective the quality of service level.

Optionally, the queuing comprises managing a plurality of queues each associated with a different quality of services; selecting per network traffic event of the plurality of network traffic events one of the plurality of queues according to a respective the quality of service level.

According to some embodiments of the present invention, there is provided a device of queuing network traffic events on a client terminal. The device comprises a monitoring module which monitors, in run time, a plurality of network traffic events triggered by a plurality of applications executed on a client terminal, a classifying module which extracts a plurality of network traffic event characteristics from each of the plurality of network traffic events and classifies each one of the plurality of network traffic events according to a respective the plurality of network traffic event characteristics, and a data connection manager which clusters the plurality of network traffic events in a plurality of clusters according to the classifying and manages an opening a plurality data connections between the client terminal and a network such that the content of each cluster of the plurality of clusters is transmitted in another of the plurality data connections.

According to some embodiments of the present invention, there is provided a system of identifying one or more malicious threats. The system comprises a plurality of monitoring modules installed in a plurality of client terminals, each the monitoring module is set to monitor, in run time, a plurality of network traffic events triggered by a plurality of applications executed on a respective the client terminal and to extract a plurality of network traffic event characteristics of each of the plurality of network traffic events, and a classifier engine which is installed on a network node and calculates at least one classifier by analyzing the plurality of network traffic event characteristics of each of the plurality of network traffic events from each of the plurality of monitoring modules. The at least one classifier is forwarded from the network node to the plurality of monitoring modules and used by each one of the plurality of monitoring modules for classifying a plurality of new network traffic events and for managing an opening a plurality data connections with a network according to the outcome of the classifying.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
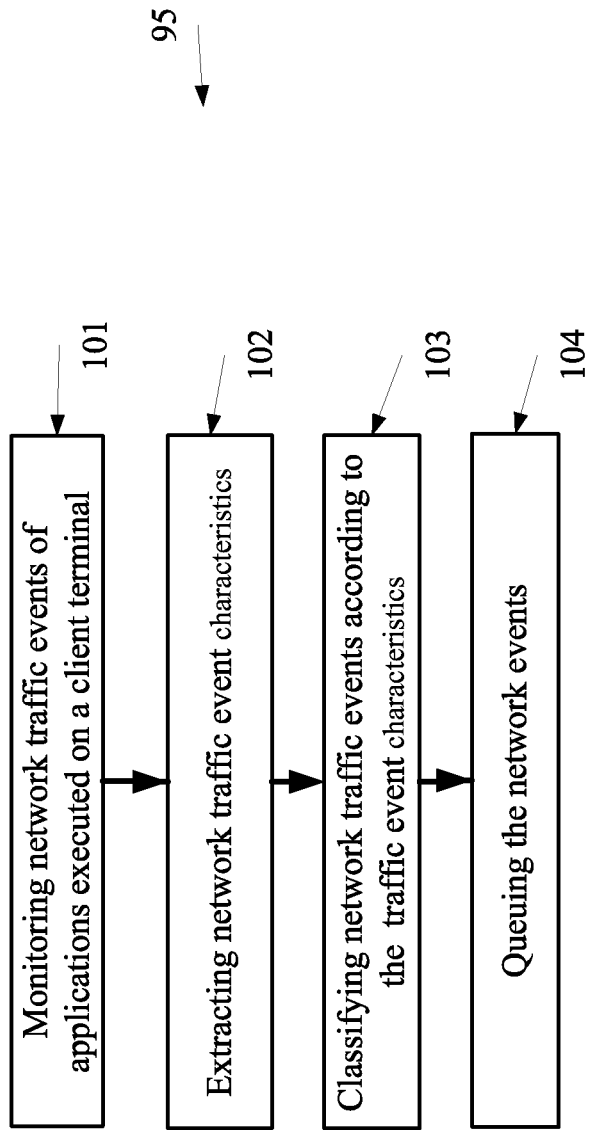
FIG. 1 is a flowchart of a method of classifying one or more network traffic events, according to some embodiments of the present invention.

The present invention, in some embodiments thereof, relates to network uplink transmission management and, more specifically, but not exclusively, to systems and methods of network traffic events management at the client terminal level.

According to an aspect of some embodiments of the present invention, there are provided methods and systems of reducing data connection opening rate between a client terminal and a network, such as a cellular network, by classifying, at the client terminal level, network traffic events according to an analysis of their characteristics, and clustering the network traffic events according to the classification for unified transmission in a common data connection session having a single data connection opening event. Optionally network traffic events are set in different queues according to their classification to provide a different quality of service to different events. The clustering may be performed by queuing network traffic events to different queues which are processed at different rates. In use, queues are served at different rates so that the number of data connections between the client terminal and a network required for serving the network traffic events is reduced.

Optionally, a classifying module located at the client terminal classifies network traffic events which require an opening of a data connection with a network when such a data connection is not established, for example a data message. The classification of each network traffic event may be based on an analysis of network traffic event characteristics, for example behavioral, temporal and/or operation characteristics thereof. The classification may be done by the classifying module using a classifier that is optionally calculated using data mining or statistical techniques. The classifier may be generated at a central unit and/or distributed to classifying modules installed at different client terminals to improve accuracy with time. The classification allows adapting the rate at which network traffic events are handled, for example singling events, according to a desired quality of service set for different network traffic event classes. The adaptation may be held by queuing network traffic events in different queues assigned for providing different quality of service such that the content of the queues is transmitted at different rates by opening a common data connection. For example, network traffic events related to advertisements, for example ad request message, is placed in a queue serviced at a low rate, network traffic events related to instant messages are placed in a queue serviced at a medium rate, and network traffic events related to media streaming are placed in a queue serviced at a high rate.

Optionally, the system includes a classifier engine which aggregates characteristics of network traffic events captured or logged at different client terminals and generates accordingly classifiers which are distributed to the classifying modules at the different client terminals.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of a method of classifying one or more network traffic events, such as uplink traffic events, routing events such as adaptive polling events and border gateway protocol (BGP) neighbor loss events, DNS lookups, and messages triggering signaling, according to some embodiments of the present invention.

The method allows controlling the quality of uplink network resource service given to network traffic events of applications hosted on a client terminal based on a classification of the network traffic events. This control allows reducing the amount of data connections which are opened for signaling and traffic flows originated from client terminals per period. The client terminal may be a cellular phone, a tablet, a router, a wearable device, a network connected node or object and/or any other processor based device.

As further described below, the method may classify network traffic events of different applications hosted on a client terminal without requiring the classification of the applications themselves in advance. This allows dynamic management of data connection opening by client terminals of a certain network, for example a cellular network. As further described below, the classification allows adapting the quality of service (QoS) given to network traffic events of applications according to a management policy and/or desired usability. For example, different QoS may be given to network traffic events which require immediate handling, such as requests for continuous media data during the playing of the media content, for instance media content, such as a video and/or an audio clip and voice over internet protocol (IP) (VoIP) messages and network traffic events which require less immediate handling, for instance mailbox messages, chat messages, and webpage or widget refresh messages and network traffic events which require even less immediate handling, for instance advertisement related messages, such as ad requests, location notification messages, and/or logging messages. Optionally, the classification allows aggregating network traffic events for a joint transmission in a common signaling triggering event, namely under a common opening and closing of a data connection.

The above method may be used for managing quality of service (QoS) which refers to the capability of a network to provide better service to selected network traffic events over various technologies, including Frame Relay, Asynchronous Transfer Mode (ATM), Ethernet and 802.1 networks, SONET, and IP-routed networks that may use any or all of these underlying technologies. The method allows providing priority to some network traffic events in terms of bandwidth and latency. Optionally, the method may be used for managing QoS in a manner that makes sure that providing priority for one or more network traffic events does not make other network traffic events fail.

Figure 2:
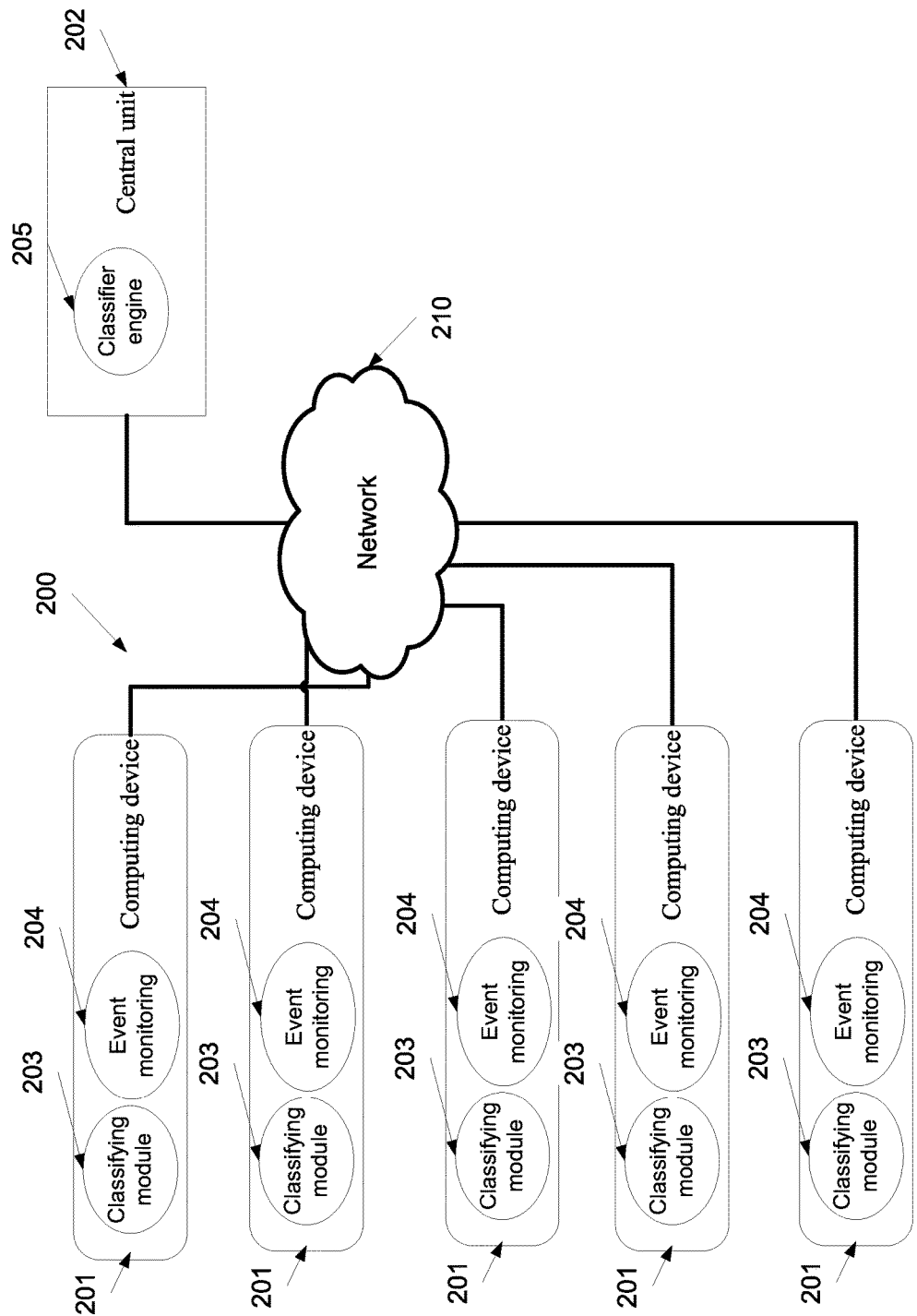
FIG. 2 is a schematic illustration of a system of classifying and queuing network traffic events at the client terminal level, according to some embodiments of the present invention.

Reference is also made to FIG. 2, which is a schematic illustration of a system 200 of classifying and queuing network traffic events at the client terminal level, optionally using classifying modules 203 executed in a plurality of client terminals 201, according to some embodiments of the present invention. The classifying modules 203 may be hardware, firmware, or software modules, for example pre-installed in client terminals such as Smartphones and/or provided as part of an operating system (OS).

Optionally, the system 200 further includes a central unit 202, such as a network node, for example a server, which executes a classifier engine 205 for generating classifiers for the classifying modules 203 based on data received from event monitoring modules 204 installed on the computing devices 201 via a network 210, for example network traffic events of applications which are installed thereon. The received data is aggregated and analyzed using various data mining and/or classification methods, for example as described below.

FIG. 1 depicts a process 95 wherein network traffic events, such as transmission and signaling flows, are continuously classified and queued accordingly in run time of a certain client terminal 201 at the certain client terminal 201 using classifiers for reducing the number of data connections established by the certain client terminal 201 per period.

First, in use, as shown at 101, a plurality of network traffic events triggered by a plurality of applications executed on a client terminal are monitored by the event monitoring module 203. Optionally, a network event detector sub module is responsible for detection of new network traffic events in the network layer of the client terminal, for instance the layer that is responsible for packet forwarding and/or routing. The network event detector identifies network traffic events such as requests for new data connections. Whenever a new connection is being established it alerts the classifier and the QoS manager and forwards the information onward. Requests may be for establishing data connections with accessories such as handset radios, data connections over a wireless local area network, such as over WiFi, data connections over a Personal local area network, such as over Bluetooth™, and/or data connections over the cellular network. The data about the plurality of network traffic events may be forwarded to the central unit 202 for classification, for example as described below.

Now, as shown at 102, a plurality event characteristics are extracted from each network traffic event and optionally logged in a feature vector or an equivalent dataset, such as a matrix row or a list. An event characteristic may be any characteristic that describes the network traffic event, for example an originating application characteristic, a data transmission protocol, a host, and a port, and/or the like, for example as described below. The originating application characteristic may be extracted from an application mapping dataset which maps characteristics of applications installed on the client terminal. These characteristics may be deduced from an analysis of application marketing page at an Application store such as the App store or Google Play, from web crawling and/or the like. For example, a characteristic may be an application type deduced from application permissions which are requested for installation. As shown at 103, each network traffic event is classified according to the extracted traffic event characteristics. For example, each feature vector may now be analyzed to classify the network traffic event it describes. The classification is optionally made by a plurality of classifiers which are received from the central unit 202. Using the classifiers, for example as detailed below, allows each classifying module 203 to label and classify events according to data about related application(s), protocol(s), port(s), host(s) or any other informative features that is found statistically useful in the process of classifying the network event/events type.

The classifiers may be applied by a sub module of the classifying module 203, a classification sub module. In use, the classification sub module is fed with the network traffic events from the network event detector. The network event detector or classification sub module may extract data regarding each one of the network traffic event, for example the type of the originating application, incoming and outgoing addresses, a protocol used, the application initiating timeframe and/or other data or metadata for classification.

Optionally, all or some of the network traffic events are automatically logged. In such embodiments, a characteristic of a network traffic event may be derived from historical network traffic events and/or metadata related thereto, for instance. For instance, a buffer which stores previous network traffic events may be stored to assist classification, for example as a dataset for extracting network traffic event characteristics.

As described above, a feature vector is generated per network traffic event. The features of the feature vector may be stored in data buffers or logs which document network traffic events and/or data related thereto. Each buffer may hold a series of predefined data points gathered from the system. For example, features may include temporal features, for example data regarding temporal network consumption of a process, behavioral features, for example the battery usage of an application, and operation features, such as the protocols used by an application, the host addresses used by an application or any other quantifiable measure that may be extracted. For example, such features may include function calls, system calls, list of permissions, list of activities and the like. In addition to the above described temporal, behavioral and operation features, a feature vector may include data or features regarding statistical information gathered from the application documented in the feature vector, for instance regarding temporal, behavioral and/or operation features. This may include any measurable features that may be extracted from a log and/or from event monitoring. These feature vectors enable, via the classification process, the ability to place a class tag on the process/application/event.

Optionally, the classification sub module manages a set of single class classifiers and/or one or more multi-class classifiers. In use, classifiers, for instance implemented as functions, are performed in parallel or serially depending on the desired precision and recall.

The classifiers are optionally received from the classifier engine 205 which enhances classifiers based on various data mining processes. For example, classifiers may be generated by the classifier engine 205 from multiple temporal snapshots of the system. In other implementations these classifiers may embed temporal information gained from the classification feature extraction modules.

For example, the classifier may classify the network traffic event according to an analysis of a feature vector documenting the frequency of the network events per application, the ports selected for the network traffic event, the hosts involved in the network traffic event and/or estimate the type of communication at hand.

The classifier engine 205 may generate classifiers in a supervised process in which the data records, such as feature vectors of applications, are labeled and split into two parts, one part is used for training and the other part for verification. The classifier engine 205 may generate classifiers in a non-supervised fashion, clustering data records without labels. In addition, classifier engine 205 may generate classifiers as or based on a set of deterministic rules that have been implemented in the machine code.

Optionally, the classifiers generated to be used in conjunction with other classifiers, depending on the desired classification result. For example, a combination of classifiers may be applied to classify feature vectors, for example a cascade of classifiers, a boosting topology of classifiers or a parallel classification scheme.

Optionally, the classification sub module includes a network filter chain classifier which classifies network events based on prior knowledge of known hosts, ports and/or protocols. This classifier may classify deterministically a network event and assign a label to the network event. Optionally, the network filter chain classifier may be used by the classifier engine 205 for training a machine learning classifier on the classifications of prior knowledge in order to increase precision. The prior knowledge used in this stage may be obtained manually and stored in the central unit 202 as a series of resource files, or obtained automatically via processing of data performed on a server. This server may implement standard machine learning techniques such as clustering or supervised learning for the synthesis of these resource files.

Optionally, the classifier engine 205 may generate classifiers using algorithmic methods for automatic classification of a training set, for example deterministic thresholds, decision trees, Neural Networks, Support Vector Machines or Nearest neighbor classifiers. These classifiers may be trained in supervised or non supervised modes.

Reference is now made, once again, to FIG. 1. The classification of each client 201 allows, as shown at 104, clustering network traffic events according to their classification. In such a manner, network traffic events of the same type may be clustered together to be transmitted on a common data connection. In such a manner, the rate of opening data connections is reduced. The clustering may be performed by queuing each one of the network traffic events on one of a plurality of queues according to a different QoS.

As shown at 105, the opening a plurality data connections between the client terminal and a wireless network, for example a cellular network, is managed, for instance by the data connection manager 206 such that the content of each cluster (e.g. queue) is transmitted in a different data connection session. Optionally, the data connection manager, also referred to herein as a QoS Manager, manages the clustering, for instance queuing, of network traffic events based on the classification thereof. The queuing clusters network traffic events for a common action of opening a new network connections at the data link layer.

For example, the QoS Manager manages the feeding of network traffic events from different applications into queues. These queues hold the networking events and data that are sent from the various applications and processes in the device.

The QoS Manager manages a number of queues, for example a queue for low priority network data such as email, an intermediate priority queue for instant messaging applications, and a fast queue for application that require a low latency channel such as voice over internet protocol (VoIP) and/or video streaming. The QoS manager is fed with classified network traffic events and uses the classification data for selecting the appropriate queue for each of the network traffic events. For example, different network traffic events of different classifications are fed into different queues, such as high priority queue, med priority queue, and low priority queue, which are handled at different rate or responsiveness pattern. For example, once a queue is filled, the QoS manager, depending on a QoS policy, opens a data connection. The QoS policy dictates the frequency of opening networking connections at the data link layer. By managing different QoS policies for different network traffic events the QoS manager affects the device signaling triggering rate and therefore also on CPU time allocated for data connection establishment and battery consumption for data connection establishment.

Optionally, the data connection manager 206 includes or connected to an RF monitor which assesses whether a data connection is currently opened or not. Depending on a connectivity state of the data connection, the QoS manager may initiate a queue flush even if it is not full. The RF Monitor may monitor the state and activity of a number of RF radio connections on the device. This may include any radio on the device such as 3G radio, Wi-Fi radio, Bluetooth™ radio and the like.

Data from the RF monitor may include a connectivity state of the radio data connection, for example FACH, DCH, Idle, and the like, the power consumption of the radios and any other data that may be required for the QoS manager to take action.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, an engine and client terminal is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of queuing network traffic events on a client terminal, comprising:
using at least one hardware processor to execute code instructions for:
monitoring, in run time, a plurality of network traffic events triggered by a plurality of applications executed on a client terminal, each of said plurality of network traffic events requiring an opening of a data connection session between said client terminal and a network;
extracting, in run time, a plurality of network traffic event characteristics of each of said plurality of network traffic events;
classifying each one of said plurality of network traffic events according to a respective said plurality of network traffic event characteristics;
clustering said plurality of network traffic events in a plurality of clusters according to said classifying;
managing an opening of a plurality of common data connection sessions between said client terminal and said network such that a content of each cluster of said plurality of clusters is jointly transmitted in another one of said plurality of data connection sessions, each of said plurality of common data connection sessions having a single data connection session opening event.

2. The method of claim 1, wherein said plurality of network traffic events are messages for opening a data connection session with said network.

3. The method of claim 1, wherein said managing comprises queuing each one of the plurality of network traffic events in one of a plurality of queues according to said classifying; and transmitting the content of each of said plurality of queues in said another one of said plurality of data connections.

4. The method of claim 1, wherein said plurality of network traffic event characteristics comprise characterizing application data about one of said plurality of applications.

5. The method of claim 4, wherein said characterizing application data is deduced from an analysis of application marketing page.

6. The method of claim 1, wherein said plurality of network traffic event characteristics comprise an outcome of statistical analysis of historical network traffic events.

7. The method of claim 1, wherein said plurality of network traffic events are data messages; wherein said plurality of network traffic event characteristics comprise a target address specified in a respective said network traffic event.

8. The method of claim 7, wherein said plurality of network traffic event characteristics comprise a battery usage of an application from said plurality of applications.

9. The method of claim 7, wherein said plurality of network traffic event characteristics comprise a data consumption pattern of an application from said plurality of applications.

10. The method of claim 1, wherein said client terminal is a cellular device and said network is a cellular network.

11. The method of claim 1, wherein said extracting comprises generating a plurality of feature vectors each describing respective said plurality of network traffic event characteristics of another of said plurality of network traffic events; wherein said classifying is performed by an analysis of said plurality of feature vectors.

12. The method of claim 1, wherein said classifying is performed by at applying at least one classifier calculated according to a statistical analysis of network traffic event characteristics of a plurality of historical network traffic events.

13. The method of claim 1, wherein said classifying comprises identifying a quality of service level for each of said plurality of network traffic events; wherein queuing each one of the plurality of network traffic events is performed according to a respective said quality of service level.

14. The method of claim 1, wherein said queuing comprises managing a plurality of queues each associated with a different quality of services; selecting per network traffic event of said plurality of network traffic events one of said plurality of queues according to a respective said quality of service level.

15. A device of queuing network traffic events on a client terminal, comprising:
A hardware processor executing a code comprising:
code instructions for monitoring, in run time, a plurality of network traffic events triggered by a plurality of applications executed on a client terminal, each of said plurality of network traffic events requiring an opening of a data connection session between said client terminal and a network;
code instructions for extracting, in run time, a plurality of network traffic event characteristics from each of said plurality of network traffic events and for classifying each one of said plurality of network traffic events according to a respective said plurality of network traffic event characteristics;
code instructions for clustering said plurality of network traffic events in a plurality of clusters according to said classifying and for managing an opening of a plurality of common data connection sessions between said client terminal and said network such that a content of each cluster of said plurality of clusters is jointly transmitted in another one of said plurality of data connection sessions, each of said plurality of common data connection sessions having a single data connection session opening event.

16. A system of identifying one or more malicious threats, comprising:
a plurality of hardware processors installed in a plurality of client terminals, each one of said plurality of hardware processors is executing a code comprising code instructions for monitoring, in run time, a plurality of network traffic events triggered by a plurality of applications executed on a respective said client terminal, each of said plurality of network traffic events requiring an opening of a data connection session between said respective client terminal and a network, and code instructions for extracting, in run time, a plurality of network traffic event characteristics of each of said plurality of network traffic events;
a server which is installed on a network node and is executing a code comprising code instructions for calculating at least one classifier by analyzing said plurality of network traffic event characteristics of each of said plurality of network traffic events from each of said plurality of hardware processors;
wherein said at least one classifier is forwarded from said network node to said plurality of hardware processors and used by each one of said plurality of hardware processors for classifying a plurality of new network traffic events and for managing an opening of a plurality of common data connection sessions with said network according to the outcome of said classifying.

17. The method of claim 1, wherein at least some of said plurality of clusters are transmitted in different data rates, according to said classifying.

18. The method of claim 1, wherein said classification comprises assigning priority to each of said plurality of clusters.

* * * * *